United States Patent
Tzeng

(10) Patent No.: US 8,341,205 B2
(45) Date of Patent: Dec. 25, 2012

(54) FAST SINGULAR VALUE DECOMPOSITION FOR EXPEDITING COMPUTER ANALYSIS SYSTEM AND APPLICATION THEREOF

(75) Inventor: Jengnan Tzeng, Taipei County (TW)

(73) Assignee: Everspeed Technology Limited, Apia (WS)

( * ) Notice: Subject to any disclaimer, the term of this patent is extended or adjusted under 35 U.S.C. 154(b) by 1210 days.

(21) Appl. No.: 12/166,610

(22) Filed: Jul. 2, 2008

(65) Prior Publication Data

US 2009/0265404 A1    Oct. 22, 2009

(30) Foreign Application Priority Data

Apr. 18, 2008   (TW) ............................... 97114316 A

(51) Int. Cl.
*G06F 7/32* (2006.01)
*G06F 7/00* (2006.01)

(52) U.S. Cl. ....................................... 708/520; 708/200

(58) Field of Classification Search .................. 708/446, 708/514, 520, 607
See application file for complete search history.

(56) References Cited

U.S. PATENT DOCUMENTS

| | | | |
|---|---|---|---|
| 7,711,762 B2* | 5/2010 | Howard et al. ............... | 708/490 |
| 2006/0111804 A1* | 5/2006 | Lin .............................. | 700/110 |
| 2006/0173948 A1* | 8/2006 | Krawiec et al. .............. | 708/607 |
| 2009/0216821 A1* | 8/2009 | Nakamura et al. ........... | 708/446 |

* cited by examiner

*Primary Examiner* — Chuong D Ngo
(74) *Attorney, Agent, or Firm* — Jianq Chyun IP Office

(57) ABSTRACT

The present invention uses a computer analysis system of a fast singular value decomposition to overcome the bottleneck of a traditional singular value decomposition that takes much computing time for decomposing a huge number of objects, and the invention can also process a matrix in any form without being limited to symmetric matrixes only. The decomposition and subgroup concept of the fast singular value decomposition works together with the decomposition of a variance matrix and the adjustment of an average vector of a column vector are used for optimizing the singular value decomposition to improve the overall computing speed of the computer analysis system.

6 Claims, 7 Drawing Sheets

FAST SINGULAR VALUE DECOMPOSITION FOR EXPEDITING COMPUTER ANALYSIS SYSTEM AND APPLICATION THEREOF

FIELD OF THE INVENTION

The present invention relates to a data processing method and a computer analysis system, and more particularly to a fast singular value decomposition for improving the data computing speed of a computer analysis system.

BACKGROUND OF THE INVENTION

In the present information blooming era, many computer analysis systems used for data processing are developed and used together with corresponding devices for analyzing and computing a desired volume of data effectively, and the numeric method is the core of data processing of these computer analysis systems. However, the increasingly high volume of data will slow down the overall computing speed of the computer analysis systems. For instance, a substantial increase of transmission speed of a wireless communication system greatly increases the volume of transmitted data, and a substantial increase of number of pixels in a charge coupled device greatly increases the video data volume and the increasingly popular network brings a huge volume of users' browsed and recorded data. Therefore, it is necessary to have a numeric method capable of quickly processing such a large volume of data for processing data in an analysis, and a numeric analysis method is used for processing and analyzing these large volumes of data. Among the numeric analysis methods, the traditional singular value decomposition (SVD) is a reliable matrix decomposition generally used for analyzing complicated data, particularly for analyses with many variables. The SVD is a method that decomposes a column space and a row space of a matrix into two orthogonal matrixes and one diagonal matrix. Assumed that X is a m*n real number matrix, and the rank of X is r, and X is decomposed into X=SVD$^T$, where S and D are orthogonal matrixes. In other words, the length of the row vector of S and D is equal to 1, and both are perpendicular to each other. V is a diagonal matrix, and the non-diagonal values of V are zero. Regardless of X being a symmetric matrix or not, XX$^T$ must be a symmetric matrix. A traditional way of solving the SVD is to multiply X by itself to obtain XX$^T$, and then find the eigen value and the eigen vector of the XX$^T$ matrix. The matrix formed by the computed eigen vectors of the XX$^T$ is matrix S, and the corresponding eigen value is equal to the square of the diagonal values of V. Similarly, X is multiplied by itself to obtain X$^T$X and then the eigen vector of the X$^T$X is computed, and the matrix of eigen vectors is the matrix D.

In recent years, the SVD technology is used extensively in the area of processing natural languages, and the most well-known method is the Latent Semantic Indexing (LSI). With the LSI technology, scholars correlate a text with a keyword and project the data of the text and the keyword into a smaller 1-D space, such that the scholars can compare and classify the text with the keyword, the text with another text, and the keyword with another keyword. In the LSI analysis process, a matrix A is used for recording a relation between the text and words. For example, in the correlation between 1,000,000 articles and 50,000 words, each row corresponds to an article, and each column corresponds to a word in the matrix as shown in Equation (1) below:

$$A = \begin{pmatrix} a_{11} & \cdots & a_{1i} & a_{1n} \\ \cdots & & & \cdots \\ a_{i1} & & a_{1j} & a_{in} \\ \cdots & & & \cdots \\ a_{m1} & \cdots & a_{mj} & a_{mn} \end{pmatrix} \quad (1)$$

In Equation (1), m=1,000,000 and n=500,000. The element (i, j) represents the weighted word frequency of the j$^{th}$ word of a dictionary appeared in the i$^{th}$ article. This matrix is very large, having 1,000,000*50,000=50,000,000,000 elements, and such a large matrix comes with a significant rank of 100, and the LSI key technology is to use the SVD to decompose the large matrix into a product of three small matrixes as shown in FIG. 1. The aforementioned matrix is decomposed into a 1,000,000*100 matrix X, a 100*100 matrix B, and a 100*500,000 matrix Y. The total number of elements of these three matrixes adds up to 150,000,000 which is only ⅓₀₀₀ of the original matrix. The corresponding storage volume and computation volume can be reduced by three or more orders of magnitude. In FIG. 1, the decomposed first matrix X represents a 100-D LSI space in the 1,000,000 articles, and the third matrix Y represents a LSI space in the 50,000 words, and the diagonal values of the middle matrix represents the significance of each axial direction in the LSI space. If an article and words are projected into the LSI space, and certain words fall in the neighborhood of the article (or in the same direction), then the words can be used as a keyword of the article. We can also compare the distance between the article and another article in the LSI space. If the distance between two articles in the LSI space is near, then the contents of the two articles will be very close. Similarly, we can also compare the distance between the word and another word to find out which vocabulary is a synonym. In other words, the LSI gives a basic application on semantics. However, if the size of n is substantially equal to m, the computing volume of the traditional SVD will be O(n$^3$), and if A is a larger matrix, then the computing time of the computer analysis system will be extended, and thus the practical application of the computer analysis system will be limited.

Principal component analysis (PCA) is also a common method based on the principle of forming data into a certain group of linear combinations of perpendicular bases through a linear conversion and used for analyzing multivariate data. The sequence of perpendicular bases corresponds to the variables corresponding to the raw data expanded in the direction of the base. To cope with the principle of information theory, the larger direction of the variable, the more significance is the information existed in the direction. Therefore, the PCA method naturally provides a data representation method according to the information significance sequence. In many applications, the major direction (or component) has provided sufficient required information, and thus the PCA becomes an important tool for reducing data and eliminating noises in data.

The principles of SVD and PCA are very similar, since the PCA starts from decomposing the variable matrix, and thus PCA can be considered as adjusting the center of mass of a row vector to zero, and then the SVD is performed for the matrix after the tensor product. If the raw data is distributed at the data with a center of mass equal to zero, then the base of the row vector decomposed by the SVD will be equal to the base decomposed by the PCA.

Multidimensional scaling (MDS) which is another important SVD application was proposed in 1952, and MDS is a method of deriving relative coordinates of an object with respect to another object from the relative distance between the objects. The main application of this method is to express a relation between these objects visually and effectively by known objects with a similarity or a difference. Therefore, MDS is usually used in a complicated data analysis, particularly a multivariate analysis. The high dimensional data is mapped into a low dimensional 2D space or 3D space to facilitate the determination by a human vision system. According to the curse of dimension, a larger data volume is required for searching data in a high dimensional space than that in a low dimensional space, and the accuracy will be lower than that of the search in a low dimensional space. Therefore, reducing to a low dimension is a necessary process, and the MDS plays a decisive role in this process. The following description of the MDS technology has show the close relationship among the MDS technology, the PCA and the SVD.

In the foregoing MDS, assumed that X is a p*N matrix; in other words, there are N objects, and each object is described by different variable of the same p types, $D=X^T X$ indicates product matrix of X, and I is a N*1 vector, and each element is defined as 1.

$$B = \left(X - \frac{1}{N} X i i^T\right)^T \left(X - \frac{1}{N} X i i^T\right) \quad (2)$$

Equation (2) shows a product matrix X shifted to the center point. In other word, the variance matrix X and matrix B are considered as results after double centering the matrix.

$$H = I - \frac{1}{N} i i^T \quad (3)$$

B can be simplified to B=HDH. Since matrix B is a symmetric matrix, the SVD decomposes B into $B=UVU^T$.

$$\sqrt{B} = X - \frac{1}{N} X i i^T = U V^{\frac{1}{2}} \quad (4)$$

The row vector of $\sqrt{B}$ is the coordinate of the center of the shifted X. Therefore, the double centering operation of a tensor product D of the matrix X precisely provides a variance matrix of the matrix X. The matrix obtained by taking the square root of the variance matrix is the matrix X with its row vector shifted to the center of mass equal to zero. Therefore, the core technology of the MDS is the double centering operation of the matrix and the square decomposition, wherein the square decomposition process uses the SVD technology to obtain a result that will lose the information of the center of mass of the raw data but maintain the relation of their relative positions. Since the MDS procedure uses the SVD technology, therefore the computing complexity of the MDS is substantially the same as that of the SVD. The traditional multidimensional scaling (MDS) is also limited by the computing volume. If the number of objects increases, the computing volume will be increased by the speed of $O(N^3)$. If the number of objects is huge, the traditional MDS can no longer be used for the foregoing purpose.

Therefore, it is a main subject of the invention to provide a numeric method that can overcome the bottleneck of taking so much computing time of the computer analysis system when the a number of objects or a data volume is processed.

SUMMARY OF THE INVENTION

In view of the foregoing shortcomings of the prior art, the inventor of the present invention based on years of experience in the related field to conduct extensive researches and experiments, and finally invented a fast singular value decomposition for expediting a computer analysis system and its application to overcome the shortcomings of the prior art.

Therefore, it is a primary objective of the present invention to overcome the bottleneck of a traditional SVD that takes much computing time for decomposing a huge number of objects, To achieve the foregoing objective, the present invention provides a fast singular value decomposition for expediting a computer analysis system, and the decomposition comprises the steps of: (a) inputting a first matrix to the computer analysis system, wherein the first matrix is a N*p matrix, and N is a number of first objects, and p is a number of variables; (b) computing an average vector of the first matrix column vector by the computer analysis system; (c) performing an overlapped random number sub-grouping of a row vector of the first matrix, and randomly decomposing the N first objects into K overlapped portions of the subgroups, wherein the overlapped portion containing contains a number of second objects, and the number of second objects is greater than the number of variables p; (d) computing a variance matrix of the row vector of each subgroup; (e) computing a multidimensional scaling of each variance matrix; (f) reorganizing the space coordinates of the multidimensional scaling; (g) adjusting a column vector of the first matrix to an average of zero, and using a QR decomposition to set the column vectors of the first matrix perpendicular with each other to compute a PCA result; (h) combining the PCA result and the average vector to form a new matrix; (i) using the QR decomposition to set the column vectors of the new matrix perpendicular to compute a diagonal matrix (Dr); (j) multiplying the diagonal matrix (Dr) to the first matrix to set the row vectors perpendicular to compute a second matrix (Sr), and multiplying the second matrix (Sr) and the diagonal matrix (Dr) to left and right sides of the first matrix to compute a third matrix (Vr); and (k) outputting a complete matrix data sequence according to the second matrix (Sr), the third matrix (Vr) and the diagonal matrix (Dr) by the computer analysis system.

In a preferred embodiment of the present invention, a method of operating a recommender system by the fast singular value decomposition comprises the following steps:

(a) inputting an information matrix recorded by a user into the recommender system; (b) using the fast singular value decomposition to compute a latent semantic index (LSI) at an expanded base of a low dimensional space; (c) sub-grouping the user into a LSI space by the expanded base LSI space; (d) creating a recommendation list corresponding to the user subgroup; (e) projecting a new user to the LSI space; (f) outputting a recommender information to the new user by the recommender system, based on the corresponding recommendation list of the new user.

In another preferred embodiment of the present invention, a method of operating an image recognition system by the fast singular value decomposition comprises the steps of:

(a) retrieving matrix data of a first image and a second image, and inputting the matrix data into the image recognition system; (b) decomposing each matrix data of the first image and the second image by a fast singular value decomposition; (c) comparing a base angle of a row vector and a base angle of a column vector of the decomposed matrix data of the first image and the second image; (d) collecting the statistics of the base angle to determine whether or not the base angle approaches 0° or 180° to obtain an analysis result; (e) determining that the first image and the second image come from a same source and the recognition result matches, if the image recognition system determines that the analysis result approaches 0° or 180°, or else the first image and the second image come from different sources and the recognition result does not match.

Although MDS is an application of SVD, the improved MDS method of the invention can also improve the computing speed of the PCA and the computing process of the SVD. Therefore, the fast singular value decomposition for expediting a computer analysis system in accordance with the present invention adopts the concepts of matrix decomposition and sub-grouping to work together with the decomposition of the variance matrix and the adjustment of an average vector of the column vectors to optimize the SVD, so as to enhance the overall computing speed of the computer analysis system.

DESCRIPTION OF THE PREFERRED EMBODIMENT

The above and other objects, features and advantages of the present invention will become apparent from the following detailed description taken with the accompanying drawing.

The QR decomposition technology is used for many times in the following description of the processes of the present invention, and thus the QR decomposition will be introduced briefly to fully disclose the invention. QR decomposition is a standard technology for setting row vectors or column vectors of a matrix perpendicular, and its theory was proposed by Gram-Schmidt. For instance, the QR decomposition of a real number matrix A is to decompose A into A=QR where Q is the perpendicular matrix (implying that QTQ=I), and R is a triangular matrix having elements with a value of zero below the diagonal.

Figure 1:
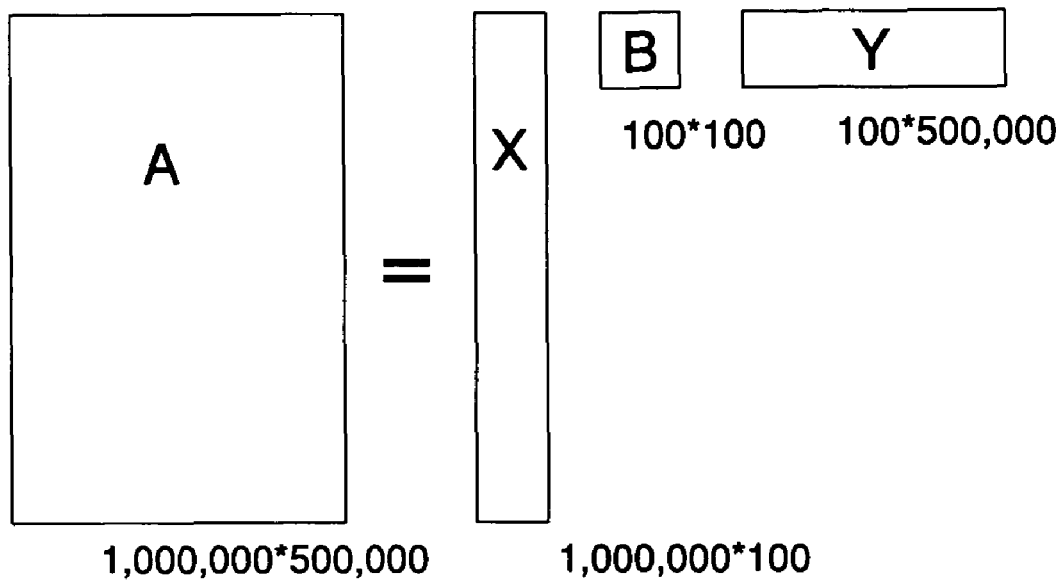
FIG. 1 shows an embodiment of a traditional singular value decomposition.
Figure 2:
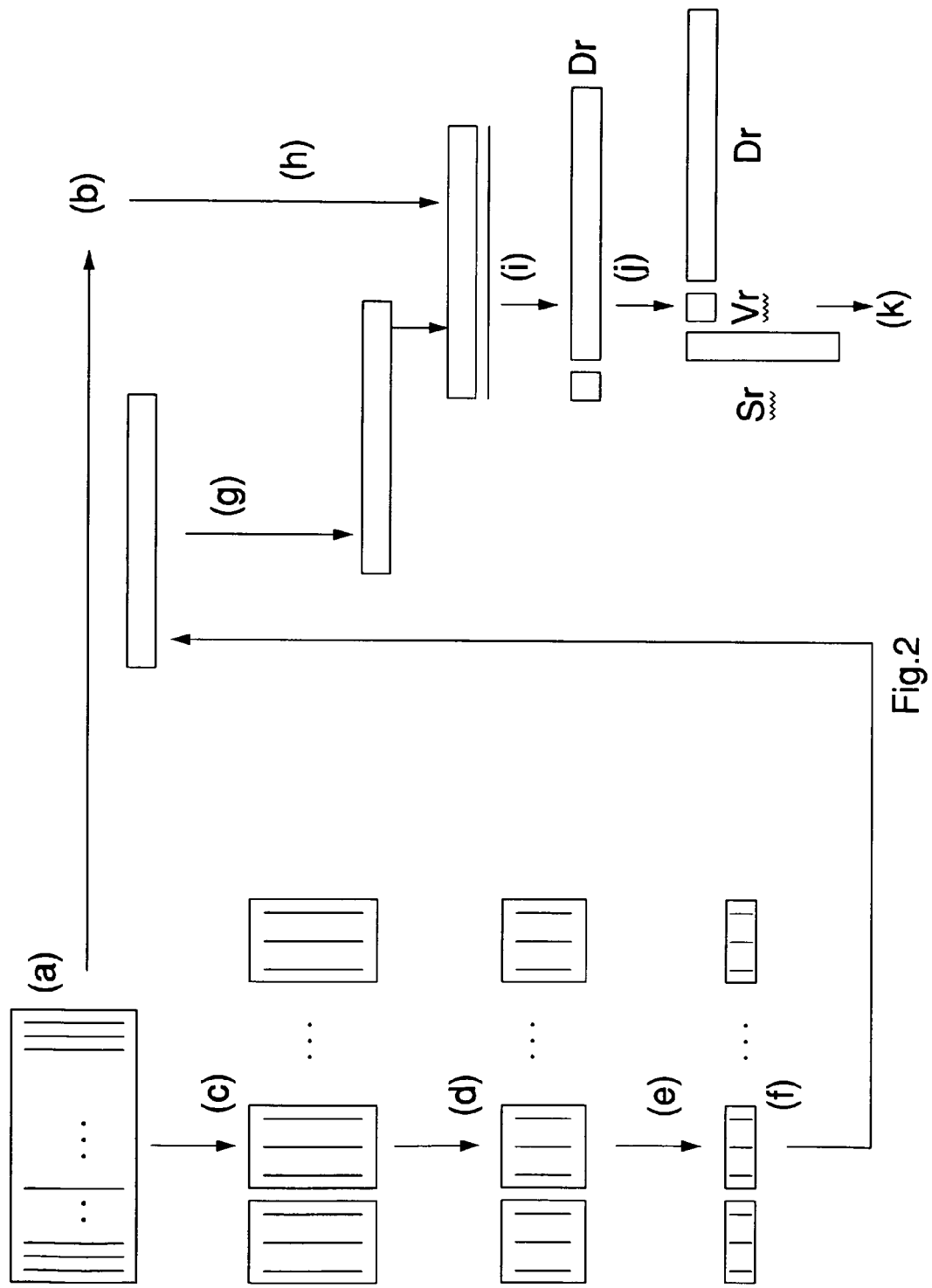
FIG. 2 shows a fast singular value decomposition of the present invention.

Referring to FIG. 2 for a flow chart of a fast SVD in accordance with the present invention, the fast SVD is performed to compute and analyze a large quantity of data to improve the system performance greatly, and its procedure comprises the steps of: (a) inputting a first matrix to a computer analysis system, wherein the first matrix is a N*p matrix, and N is a number of first observed objects, and p is a number of variables for describing the observed objects; (b) computing an average vector of a column vector of the first matrix by the computer analysis system; (c) performing an overlapped random number sub-grouping for a row vector of the first matrix to randomly decompose the N first objects into K partially overlapped subgroups, wherein the overlapped portion contains a number of second objects, and the number of second objects is preferably greater than the number of variables p; (d) computing a variance matrix for the row vector of each subgroup; (e) computing a multidimensional scaling (MDS) for each of the variance matrixes; (f) reorganizing space coordinates of the multidimensional scaling; (g) adjusting the first matrix column vector to an average of zero, and using a QR, and using a QR decomposition to set the column vectors of the first matrix perpendicular with each other to compute a PCA result; (h) combining the PCA result and the average vector to form a new matrix; (i) using the QR decomposition to set the column vector of the new matrix perpendicular to compute a diagonal matrix (Dr); (j) multiplying the diagonal matrix (Dr) to the first matrix and set the row vector perpendicular to compute a second matrix (Sr), and multiplying the second matrix (Sr) and the diagonal matrix (Dr) to left and right sides of the first matrix to compute a third matrix (Vr); and (k) outputting a complete data sequence of the matrix by the computer analysis system according to the second matrix (Sr), the third matrix (Vr) and the diagonal matrix (Dr).

The foregoing step (i) uses the QR decomposition to compute a conversion equation required for combining the coordinates of the subgroups. For example, the MDS coordinate of the first subgroup is $X_1$, and the MDS coordinate of the second subgroup is $X_2$, and $\overline{X_1}$ and $\overline{X_2}$ correspond to a centralizing coordinate matrix of the row vector, and thus the conversion equation becomes $X_1=Q_1Q_2^TX_2-Q_1Q_2^T(\overline{X_2}i^T)+\overline{X_1}i^T$. With this equation, the coordinate of $X_2$ can be converted into the $X_1$ coordinates system, and so forth. Therefore, the coordinates system of each subgroup is converted into the first coordinates system to obtain a complete coordinate. In general, the dimensions represented for connecting the coordinates of two groups are equal. If the dimensions represented for connecting the coordinates of two groups are different, such as the dimension of $X_1$ is $r_1$, and the dimension Of $X_2$ is $r_2$, and $r_1<r_2$, then the coordinate of $X_2$ will not be converted to the coordinate of $X_1$ but the low dimensional coordinate is converted into a high dimensional coordinate, and the conversion equation will become $X_2=Q_2Q_1^TX_1-Q_2Q_1^T(\overline{X_1}i^T)+\overline{X_2}i^T$. Now, $Q_2$ only takes $r_1$ row vector, and thus $Q_2$ is a $r_2*r_1$ matrix, and $Q_1$ is a $r_1*r_1$ matrix, and the equation can still satisfies the form of a general equation. To connect more coordinates systems, the principle of converting a low dimensional coordinates system to a high dimensional coordinates system is adopted for connecting the coordinates system serially one by one.

Figure 3:
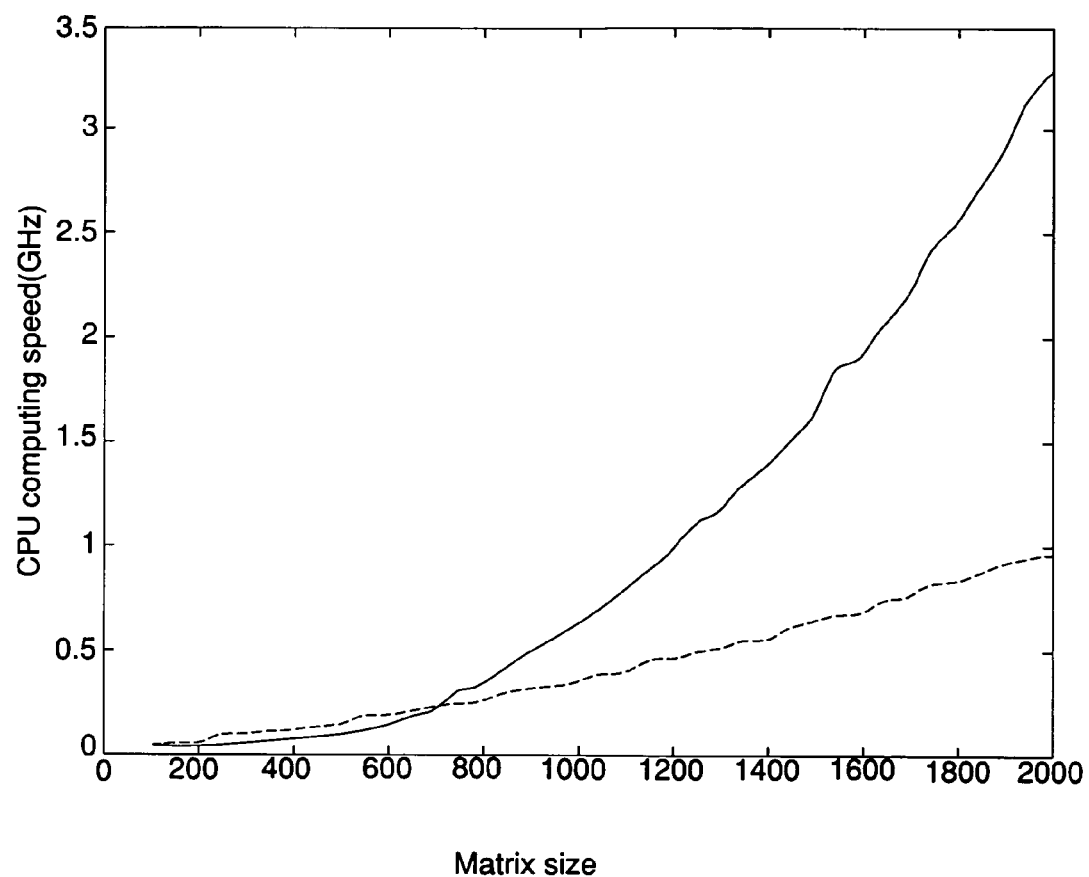
FIG. 3 shows a graph of a computing speed of a non-full rank matrix.
Figure 4:
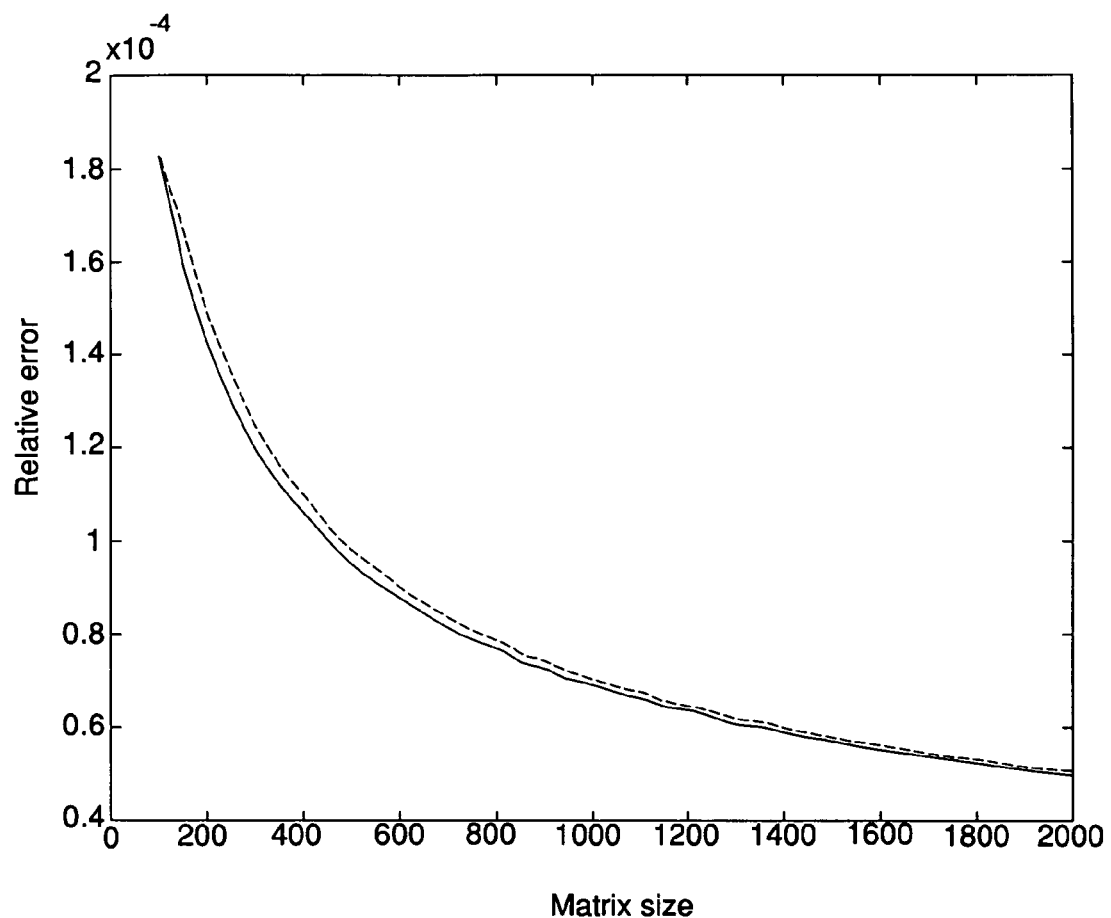
FIG. 4 shows a graph of a computing accuracy of a non-full rank matrix.
Figure 5:
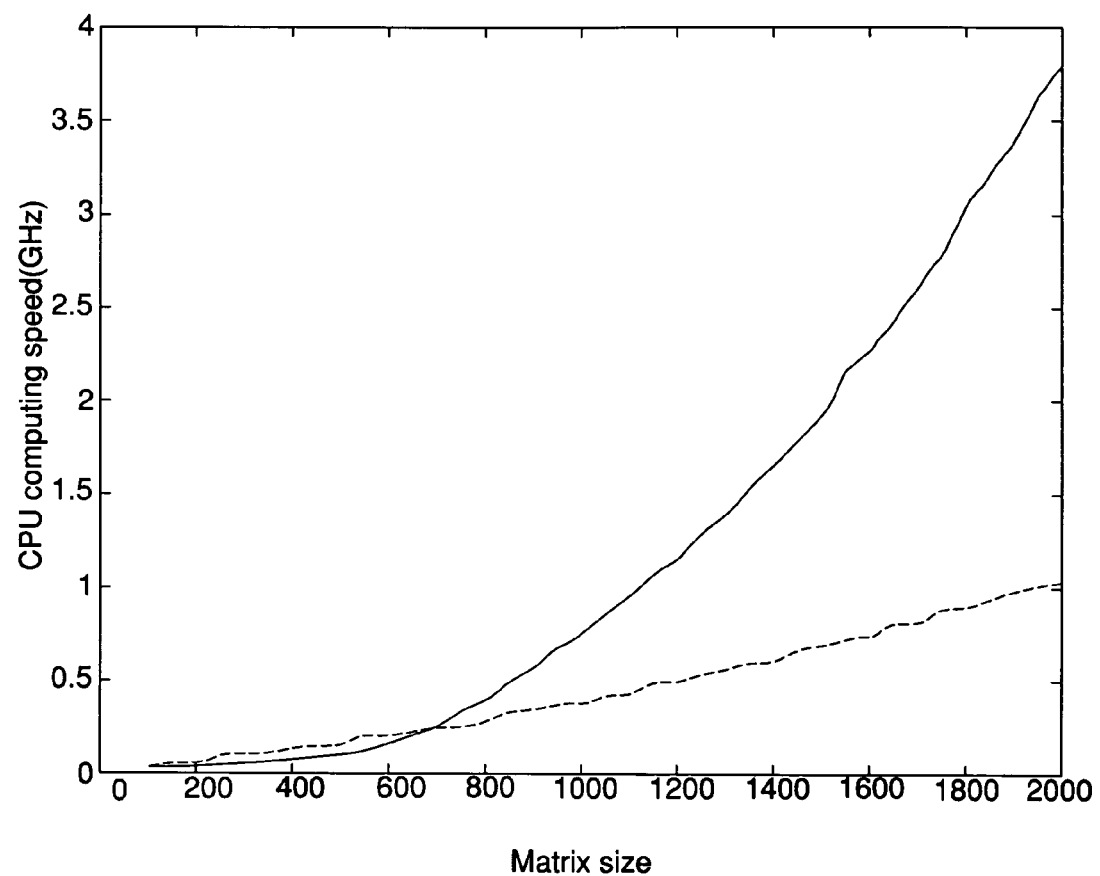
FIG. 5 shows a graph of the time required by the SVD for computing the first ten singular values of a full rank matrix.

Referring to FIGS. 3 to 5 for related simulated graphs of comparing a computer analysis system using a fast SVD in accordance with the present invention with a traditional computer analysis system using a SVD. The x-axis of the graphs represents n in a matrix n*m, and the simulated matrix has the condition of n=m with a size ranging from 100*100 matrix to 2000*2000 matrix, for analyzing the speed and accuracy of the fast SVD and the SVD and performing a simulated testing to the full rank matrix and the non-full rank matrix respectively.

In a non-full rank matrix, the rank of the matrix is equal to 10 corresponding to the size of a matrix. A random number is used to generate 16 matrixes of the same size and the same rank, and each element in the matrix is a random number obtained from a uniformly distributed interval [0,1]. After the SVD for decomposing the required time and the error is computed, the 16 random numbers are used for generating an average of the corresponding results of the matrix as the data used in the graph.

Referring to FIG. 3 for a graph of comparing the computing speed of a non-full rank matrix, the solid line represents a traditional SVD, and the dotted line represents a fast SVD of the present invention. In FIG. 3, it is obvious that the computing speed is improved significantly as the size of the matrix increases. Referring to FIG. 4 for a graph of comparing the computing accuracy of a non-full rank matrix, the graph shows a relative error. In FIG. 4, it is obvious that the relative error does not increase as the size of the matrix increases, and there is no substantial difference between the computational error of the fast SVD of the invention and the error of the traditional SVD 的, error. Referring to FIG. 5 for the time required by the SVD for computing the first ten singular values of a full rank matrix, it shows that the required computing time of the fast SVD algorithm of the invention increases linearly with the size of the matrix, and the computing time of the invention is much shorter than the computing time of the traditional indexing SVD.

In a preferred embodiment of the present invention, a computer analysis system using the fast SVD in accordance with the invention is applied to a recommender system. The recommender system is a very popular subject in the area of artificial intelligence in this decade, and the recommender system integrates knowledge from the fields of statistics, recognition science, data processing, and numeric algorithm, and the system is used extensively in different fields such as customer management systems, interactive websites, and recommended advertising. In the present information blooming era, network users can browse a website with limitations within a limited time, and the main function of the recommender system is to provide recommendations in a fast and accurate manner, but the fast and accurate conditions always conflict with the limitation conditions. Therefore, the invention uses a computer analysis system with a fast SVD to develop a modern, fast and accurate recommender system.

There are two major types of recommender systems. A major type of the systems is provided for a single user to record a recommendation, and the method of this system only uses the records of a single user to learn the user's taste, and the multivariate analysis of the statistical method is usually applied in this area. The other major type is to learn general data, and this method uses the records of other users to assist learning the user's taste, and it is often to have missing data in the user records, and it is common to make up the missing data by the information of other users with similar taste. As a result, the learning of general data is better than the recommendation recorded by a single user. The popular general data learning recommender system adopts a collaborative filtering.

The common collaborative filtering includes a POP algorithm, a nearest neighbor algorithm, and an eigentaste algorithm. The aforementioned methods have to define the distance between the user's taste and another user's taste, and this distance is related to the objects clicked by the users. If another user having similar taste has clicked the same object, there will be two challenges in the process of defining the distance. Firstly, different objects may represent the same taste. Secondly, many non-clicked objects still may fall within the range of the user's taste, and most of these objects are simply objects that the user does not have a chance to select. To overcome the aforementioned two issues, common statistical methods such as an Isomap and a latent semantic index (LSI) are usually used, and most of the recommender systems use one of these two methods to achieve the conversion of a high dimensional data into a low dimensional space for the comparison, the definition of distance, and the classification. The Isomap is a method similar to the MDS, that converts the similarity or difference into a low dimensional data, and the difference of the MDS resides on that the Isomap converts the difference of data into a distance with the shortest path, and uses the converted distance matrix to compute a MDS result. If the data is incomplete and the data comes with a special distributed structure, the computing result obtained by the Isomap is more significant than that of the MDS.

Regardless of Isomap or LSI, the basic core uses SVD to obtain an expanded base of the low dimensional space. To achieve a more accurate recommendation, which includes the recommended data, the user's low dimensional performance of the LSI is re-computed timely, and that is the key of the whole recommender system. In the prior art, the computing speed of the traditional SVD is of a scale of $O(n^3)$, and if the number of users is huge, it will be difficult to achieve the effect of timely updating the computing scale of $O(n^3)$ in a short time. Therefore, the method of operating the recommender system by using the fast SVD of the invention can improve the requirement of timely updating the recommender information.

Figure 6:
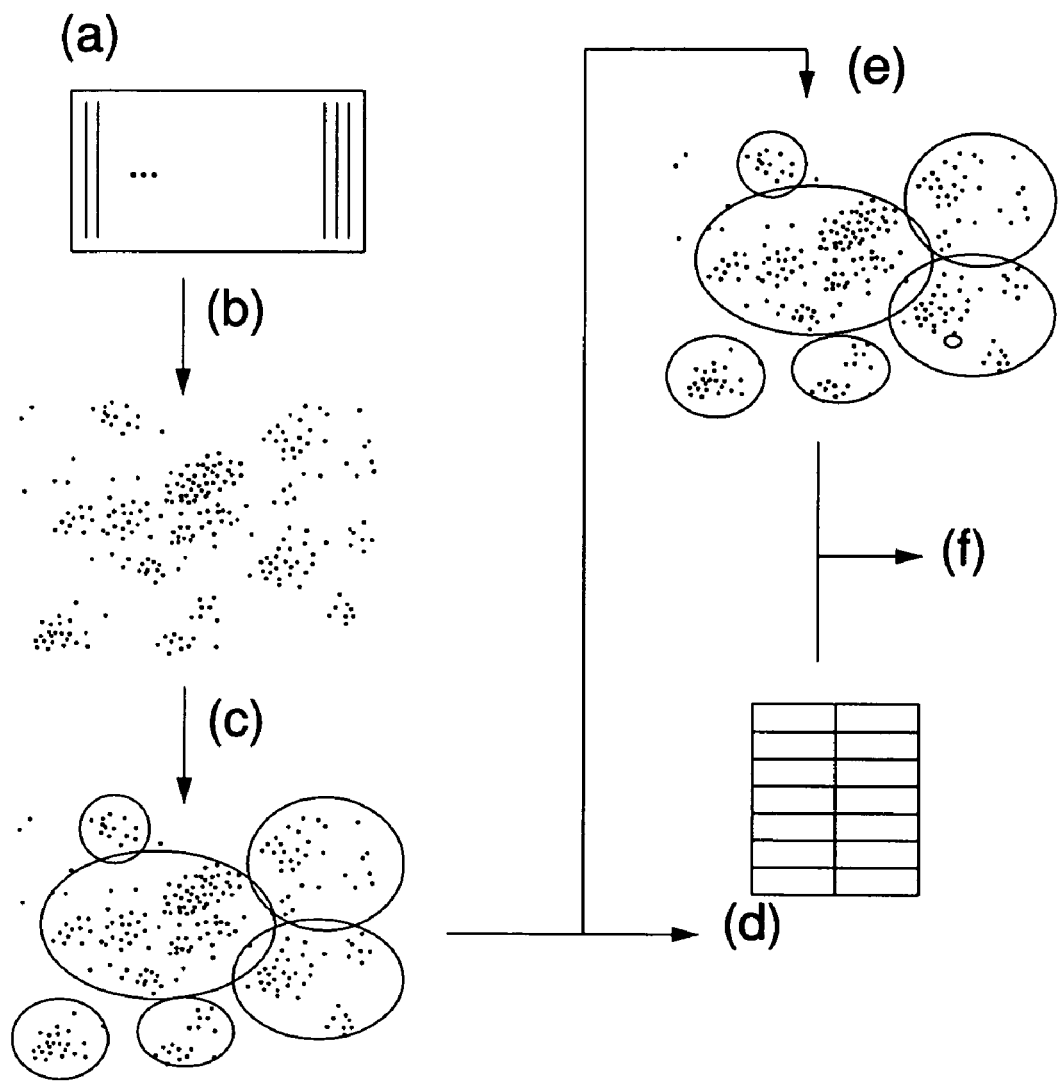
FIG. 6 shows a method of applying a fast singular value decomposition to the operation of a recommender system in accordance with the present invention.

Referring to FIG. 6 for a flow chart of a method of operating a recommender system by using a fast singular value decomposition in accordance with the present invention, the method comprises the steps of: (a) inputting an information matrix recorded by a user into the recommender system, wherein for a N*p matrix, N is a number of users on the network, and p is the number of webpage available for browsing in a webpage server; (b) using the fast singular value decomposition (SVD) to compute a latent semantic index (LSI) at an expanded base of a low dimensional space; (c) sub-grouping the user into a LSI space by the expanded base LSI space; (d) creating a recommendation list corresponding to the user subgroup; (e) projecting a new user to the LSI space; and (f) outputting a recommender information to the new user by the recommender system, based on the corresponding recommendation list of the new user.

In another preferred embodiment of a method of using a computer analysis system with a fast SVD of the invention is applied to an image recognition system, each image in the image system can be a matrix. When the digital data of two images are compared point by point, and the different sizes of the images are adjusted, and the images are shifted and rotated slightly, a substantial difference will occur in the point-to-point comparison. In other words, two resembled images may have a substantial difference in their point-to-point comparison. Therefore, the most reliable method is to adjust the corresponding images to the same size, and then compute the SVD of the two images, and compare the base of the row vector and the base of the column vector according to the sequence of the singular values. The comparison method computes the included angle of the vectors. In general, the difference of the vector directions of corresponding row vectors and column vectors of two visually resembled images or two images from the same source is not big, and thus the computed result of the included angle will approach 180° (or in parallel). The computer analysis system adopting the present invention simply needs comparing the base of the row vector and the base of the column vector corresponding to the previous two largest singular values. The base of the row vector and the base of the column vector having a smaller singular value can be considered as an expanded base of an interfered item or a noise.

Figure 7:
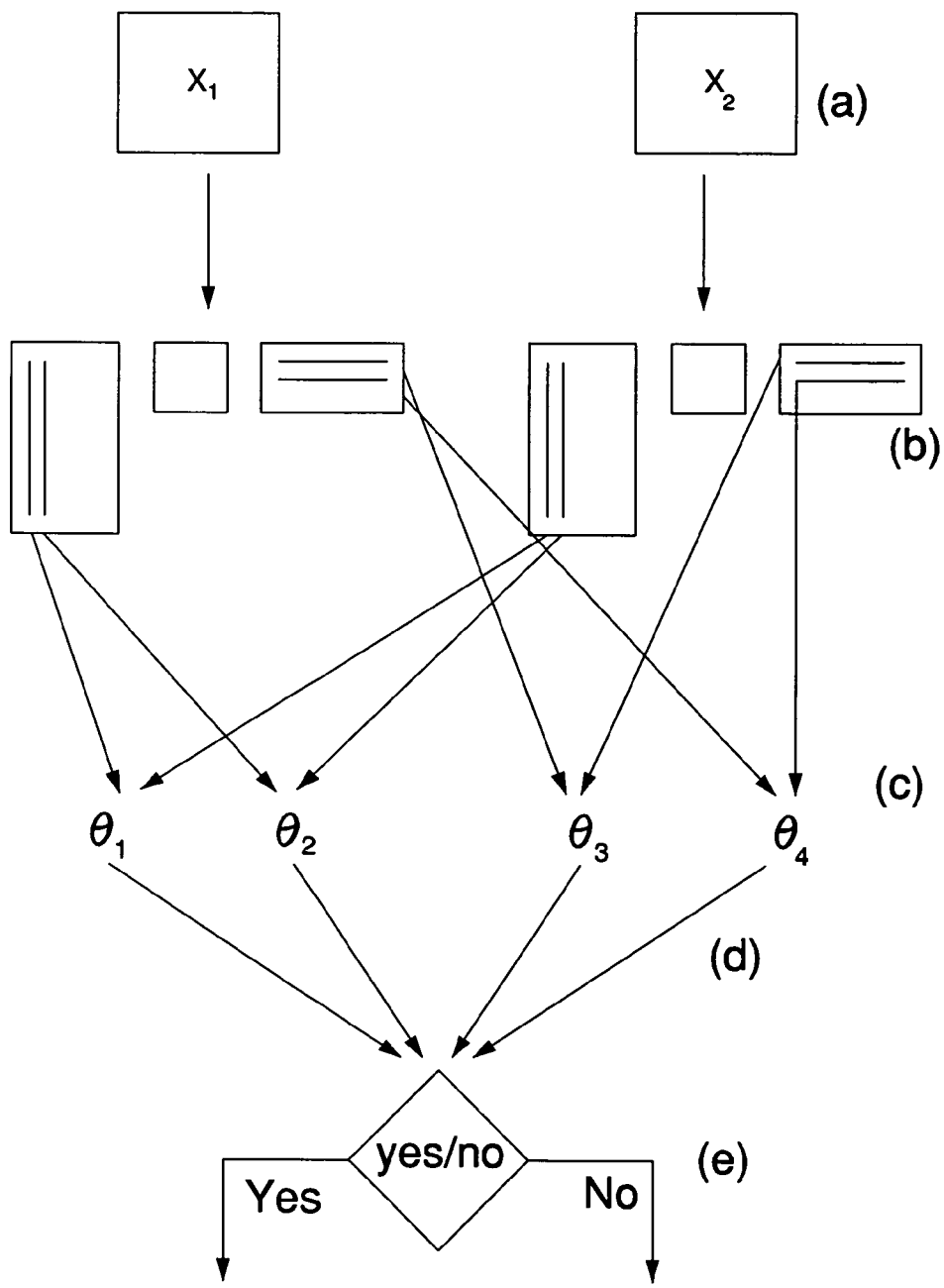
FIG. 7 shows a method of applying a fast singular value decomposition to the operation of an image recognition system in accordance with the present invention.

Referring to FIG. 7 for a method of operating an image recognition system that applies a fast singular value decomposition in accordance with the present invention, the method comprises the steps of:

(a) retrieving matrix data of a first image $X_1$ and a second image $X_2$, and inputting the matrix data into the image recognition system, wherein the N and p matrix data of the N*p matrix can be he pixel numbers on the x-axis and the y-axis of the images; (b) decomposing each matrix data of the first image $X_1$ and the second image $X_2$ by a fast singular value decomposition; (c) comparing a base angle of a row vector and a base angle of a column vector of the decomposed matrix data of the first image $X_1$ and the second image $X_2$; (d) collecting the statistics of the base angle to determine whether or not the base angle approaches 0° or 180° to obtain an analysis result; (e) determining that the first image and the second image come from a same source and the recognition result matches, if the image recognition system determines that the analysis result approaches 0° or 180°, or else the first image and the second image come from different sources and the recognition result does not match.

The foregoing fast SVD is derived from the matrix eigen value of the matrix decomposition, and thus the fast SVD is related to an application that requires a computation of an eigen value. In addition of the two preferred embodiments of the present invention, the SVD is applied to compute the large variable direction of the high dimensional data in statistics, and thus the SVD has been applied extensively in the field of DNA researches. In a numeric computation, SVD is generally used for solving an ill-pose inverse problem, since the SVD is capable of finding an approximate solution most quickly among numerous solutions of the ill-pose inverse problem. In the field of communications, SVD provides the most natural spectrum analysis. In the field of artificial intelligence, particularly the semantic related area, SVD also provides the capability of converting complicated data into a more correlated eigen space. In other words, SVD is an important foundation of modern numeric analysis and computation.

In summation of the description above, the fast SVD applied for expediting a computer analysis system in accordance with the present invention overcomes a traditional singular value decomposition that takes much computing time for decomposing a huge number of objects, and the invention can also process a matrix in any form without being limited to symmetric matrixes only. The decomposition and subgroup concept of the fast singular value decomposition works together with the decomposition of a variance matrix and the adjustment of an average vector of a column vector are used for optimizing the singular value decomposition to improve the overall computing speed of the computer analysis system.

While the invention has been described by means of specific embodiments, numerous modifications and variations could be made thereto by those skilled in the art without departing from the scope and spirit of the invention set forth in the claims.

What is claimed is:

1. A fast singular value decomposition for expediting a computer analysis system having a processor, comprising the steps of:

(a) inputting a first matrix into the computer analysis system, wherein the first matrix is a N*p matrix, and N is the quantity of a first object, and p is the quantity of a variable;

(b) computing an average vector of a column vector of the first matrix by the processor;

(c) performing an overlapped random number sub-grouping for a row vector of the first matrix to randomly decompose the N first objects into K partially overlapped subgroups by the processor;

(d) computing a variance matrix for the row vector of each subgroup by the processor;

(e) computing a multidimensional scaling for each of the variance matrixes by the processor;

(f) reorganizing space coordinates of the multidimensional scaling by the processor;

(g) converting the reorganized multidimensional scaling coordinates into a principal component analysis (PCA) result by the processor; and (h) using the PCA result and the average vector to output a complete matrix data sequence by the processor.

2. The fast singular value decomposition of claim 1, wherein the step (c) further comprises:

overlapping a portion including a number of second objects, and the number of second objects being greater than the number of variables p by the processor.

3. The fast singular value decomposition of claim 1, wherein the step (g) further comprises:

adjusting the first matrix column vector to an average of zero, and using QR decomposition to compute the perpendicular column vectors of the first matrix to obtain a PCA result by the processor.

4. The fast singular value decomposition of claim 3, wherein the step (h) further comprises:

combining the PCA result and the average vector to form a new matrix by the processor;

using a QR decomposition to set the column vectors of the new matrix perpendicular to compute a diagonal matrix (Dr) by the processor;

multiplying the diagonal matrix (Dr) with the first matrix and set the row vectors perpendicular to compute a second matrix (Sr) by the processor;

multiplying the second matrix (Sr) and the diagonal matrix (Dr) to both left and right sides of the first matrix respectively to compute a third matrix (Vr) by the processor; and outputting a complete digital data sequence of the matrix by the processor according to the second matrix(Sr), the third matrix (Vr) and the diagonal matrix (Dr).

5. A method of generating recommended information by the fast singular value decomposition of claim 1, comprising the steps of:

(a) inputting an information matrix recorded by a user into the computer analysis system;

(b) using the fast singular value decomposition to compute a latent semantic index (LSI) at an expanded base of a low dimensional space by a processor of the computer analysis system;

(c) sub-grouping the user into a LSI space by the expanded base LSI space by the processor;

(d) creating a recommendation list corresponding to the user subgroup by the processor;

(e) projecting a new user to the LSI space by the processor;

(f) outputting a recommender information to the new user by the processor based on the corresponding recommendation list of the new user.

6. A method of recognizing images by the fast singular value decomposition of claim 1, comprising the steps of:

(a) retrieving matrix data of a first image and a second image, and inputting the matrix data into the computer analysis system;

(b) decomposing each matrix data of the first image and the second image by a fast singular value decomposition by a processor of the computer analysis system;

(c) comparing a base angle of a row vector and a base angle of a column vector of the decomposed matrix data of the first image and the second image by the processor;

(d) collecting the statistics of the base angle to determine whether or not the base angle approaches 0° or 180° to obtain an analysis result by the processor;

(e) if the base angle approaches 0° or 180°, determining that the first image and the second image come from a same source and the recognition result matches by the processor; and (f) if the base angle does not approach 0° or 180°, determining that the first image and the second image come from different sources and the recognition result does not match by the processor.

* * * * *